United States Patent
Neo et al.

(10) Patent No.: US 9,258,385 B2
(45) Date of Patent: Feb. 9, 2016

(54) METHOD FOR LOADING A PROGRAM MODULE INTO A NETWORK DEVICE AND NETWORK WITH NETWORK DEVICES

(75) Inventors: Teng Long Neo, Singapore (SG); Mee Hing He, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 2240 days.

(21) Appl. No.: 11/860,558

(22) Filed: Sep. 25, 2007

(65) Prior Publication Data

US 2009/0083397 A1 Mar. 26, 2009

(51) Int. Cl.
*G06F 15/177* (2006.01)
*A63F 9/24* (2006.01)
*G06Q 40/00* (2012.01)
*H04L 29/08* (2006.01)
*G06F 9/445* (2006.01)
*G06Q 30/02* (2012.01)
*H04N 1/00* (2006.01)

(52) U.S. Cl.
CPC ........ *H04L 67/34* (2013.01); *G06F 8/61* (2013.01); *G06Q 30/0267* (2013.01); *H04N 1/00132* (2013.01)

(58) Field of Classification Search
CPC . H04N 2201/3205; H04N 13/02; G11B 27/28
USPC ............ 709/227, 223, 220; 713/155; 707/10; 379/406.11
See application file for complete search history.

(56) References Cited

U.S. PATENT DOCUMENTS

| | | | | |
|---|---|---|---|---|
| 4,625,081 A * | 11/1986 | Lotito et al. | | 379/88.26 |
| 4,644,467 A * | 2/1987 | McCarthy | | 710/244 |
| 4,710,613 A * | 12/1987 | Shigenaga | | 235/380 |
| 5,274,771 A | 12/1993 | Hamilton | | |
| 5,880,386 A * | 3/1999 | Wachi et al. | | 84/601 |
| 6,430,706 B1 * | 8/2002 | Santerre et al. | | 714/36 |
| 6,505,212 B2 * | 1/2003 | Nakano et al. | | 707/691 |
| 6,535,977 B1 * | 3/2003 | Holle et al. | | 713/2 |
| 6,658,469 B1 * | 12/2003 | Massa et al. | | 709/224 |
| 6,760,441 B1 * | 7/2004 | Ellison et al. | | 380/45 |
| 6,782,527 B1 * | 8/2004 | Kouznetsov et al. | | 717/103 |
| 6,912,653 B2 * | 6/2005 | Gohl | | 713/155 |
| 7,076,691 B1 * | 7/2006 | Dobberpuhl et al. | | 714/13 |
| 7,143,168 B1 * | 11/2006 | DiBiasio et al. | | 709/226 |
| 7,281,043 B1 * | 10/2007 | Davie | | 709/226 |
| 7,322,031 B2 * | 1/2008 | Davis et al. | | 717/177 |
| 7,430,736 B2 * | 9/2008 | Nguyen et al. | | 717/176 |
| 7,516,121 B2 * | 4/2009 | Liu et al. | | |
| 7,554,467 B2 * | 6/2009 | Thomas | | 341/106 |
| 7,565,419 B1 * | 7/2009 | Kwiatkowski et al. | | 709/223 |
| 7,636,174 B2 * | 12/2009 | Fukuda | | 358/1.15 |
| 7,797,204 B2 * | 9/2010 | Balent | | 705/28 |
| 7,885,899 B1 * | 2/2011 | Sancho | | 705/67 |

(Continued)

OTHER PUBLICATIONS

German Examination Report, Application No. 102008048877.1-53, dated Oct. 28, 2010, 4 pages.

*Primary Examiner* — Krista Zele
*Assistant Examiner* — Margishi Desai
(74) *Attorney, Agent, or Firm* — Schiff Hardin LLP

(57) ABSTRACT

A method for loading program modules into programmable network devices of a network comprises loading an ID-generator into each network device for generating a unique identification code for the network devices. Next the program modules are loaded into the network devices based on the identification codes. Thus selective programming of network devices within a network is possible.

8 Claims, 2 Drawing Sheets

(56) References Cited

U.S. PATENT DOCUMENTS

| | | | |
|---|---|---|---|
| 2001/0021915 A1* | 9/2001 | Cohen et al. | 705/14 |
| 2002/0054573 A1 | 5/2002 | Bengtsson | |
| 2002/0162032 A1* | 10/2002 | Gundersen et al. | 713/300 |
| 2003/0055828 A1* | 3/2003 | Koch et al. | 707/10 |
| 2003/0069938 A1* | 4/2003 | Russell | 709/213 |
| 2004/0073483 A1* | 4/2004 | Cohen et al. | 705/14 |
| 2004/0117321 A1* | 6/2004 | Sancho | 705/76 |
| 2005/0004875 A1* | 1/2005 | Kontio et al. | 705/52 |
| 2005/0091075 A1* | 4/2005 | Cohen et al. | 705/1 |
| 2005/0149411 A1* | 7/2005 | Colwell | 705/27 |
| 2005/0243366 A1* | 11/2005 | Fukuda | 358/1.15 |
| 2006/0020556 A1* | 1/2006 | Hamnen | 705/59 |
| 2006/0067560 A1* | 3/2006 | Ochiai | 382/100 |
| 2006/0250994 A1* | 11/2006 | Sasaki et al. | 370/264 |
| 2006/0293784 A1* | 12/2006 | Braunstein | 700/231 |
| 2007/0006223 A1* | 1/2007 | Wetherly et al. | 717/178 |
| 2007/0036163 A1* | 2/2007 | DiBiasio et al. | 370/395.4 |
| 2007/0067315 A1* | 3/2007 | Hegde et al. | 707/10 |
| 2007/0106668 A1* | 5/2007 | Maegawa et al. | 707/9 |
| 2007/0168348 A1* | 7/2007 | Forsyth | 707/10 |
| 2007/0180503 A1* | 8/2007 | Li et al. | 726/5 |
| 2007/0297407 A1* | 12/2007 | Kubota | 370/390 |
| 2008/0134165 A1* | 6/2008 | Anderson et al. | 717/173 |
| 2008/0189419 A1* | 8/2008 | Girle et al. | 709/227 |
| 2008/0201759 A1* | 8/2008 | Downen et al. | 726/1 |
| 2008/0317241 A1* | 12/2008 | Wang et al. | 379/406.11 |
| 2009/0037448 A1* | 2/2009 | Thomas | 707/101 |

* cited by examiner

METHOD FOR LOADING A PROGRAM MODULE INTO A NETWORK DEVICE AND NETWORK WITH NETWORK DEVICES

FIELD OF THE INVENTION

The invention relates to a network with network devices and the loading of program modules into network devices within a network.

BACKGROUND

In a network comprising a plurality of network devices, each of the different network devices can be provided with a unique identification code. A network device can be any device that can communicate within a network. With a unique identification code a network device can be addressed selectively, for example in order to send data to it, to request data from it, or generally speaking to communicate with it. The data may be of any kind and may be values measured by the network device data to control or setup the network device or data for a further communication between the network device and a further device connected to the network device.

Usually the network devices perform specific tasks that may not be the same for all network devices. If a network device is programmable, the task performed by that network device may be determined by a program module loaded into that network device. A program module is generally all data that determines the performance of a network device and a programmable network device is generally a network device whose performance can be modified by data.

In order to set up a programmable network device for its specific performance, it is necessary to load the corresponding program module into this network device. If the program module is intended only for individual ones of a plurality of network devices and not for all, it is necessary to be able to selectively access those network devices by means of the identification code. Network devices that are to be loaded with a program module that is intended for all network devices do not necessarily need to have an identification code since there is no need to access them separately. Each network device can also be loaded with more than one software module depending on the specific tasks of this network device and on the breadth or complexity of the program module.

SUMMARY OF THE INVENTION

Embodiments of the invention are directed to a method for loading a program module into a network device and to a network comprising network devices. A method for loading a program module into one of a plurality of network devices comprises generating a unique identification code for at least one network device, assigning the program module to an identification module and loading the program module into a network device based on the identification code.

DETAILED DESCRIPTION

Figure 1:
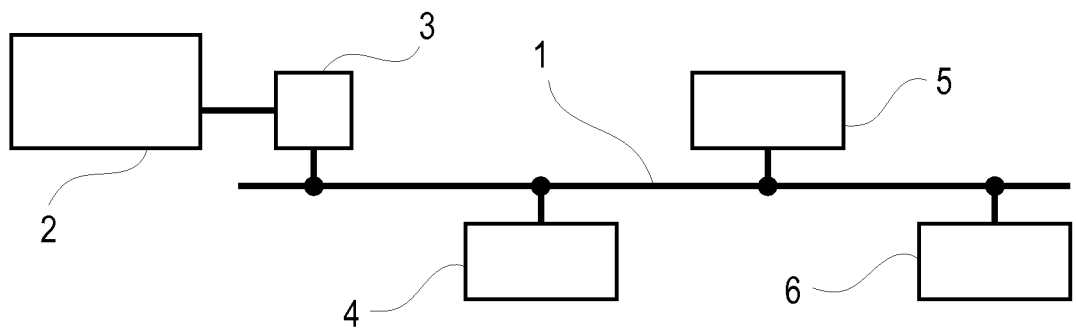
FIG. 1 shows a schematic block diagram of a network comprising a plurality of network devices and connected to a host according to an embodiment of the invention.

FIG. 1 shows a schematic block diagram of a network comprising a plurality of network devices 4, 5, 6. In this embodiment all depicted network devices 4, 5, 6 are programmable network devices and comprise a memory for storing at least one program module and a processor that can carry out a program module. The network may comprise further programmable network devices and non-programmable network devices in other embodiments. Network devices 4, 5, 6 are communicatively coupled via a bus 1 to which a host 2 is coupled via an interface 3. The network devices 4, 5, 6 furthermore each comprise a clock generator and a timer.

Host 2 may be connected directly to the bus 1 without an interface 3 if the host 2 has the required circuitry in order to communicate over the bus 1 with the network devices 4, 5, 6. The host 2 may be a personal computer or any other device capable of communicating with network devices 4, 5, 6. The network devices 4, 5, 6 are arranged in a vehicle or an industrial device and fulfill specific functions. Generally they may be placed in any target environment where they carry out specific tasks. The host 2 may be removable from the bus 1 so that after setting up the network devices 4, 5, 6 the host 2 and in some cases also the interface 3 may be disconnected from the bus 1 and removed.

In the depicted embodiment the bus 1 has a longitudinal structure to which network devices 4, 5, 6 and the interface 3 are connected. In other embodiments the bus 1 can be replaced by a network wiring having a mesh, ring or star topology. The network type or protocol can be chosen depending on the topology. If for example the wiring has a ring topology, only protocols suited for ring topologies can be used. Here the network is a LIN (Local Interconnect Network) bus. The network can comprise one host 2 and a plurality of slaves referred to as network devices 4, 5, 6. The network may also be any other kind of network using identification codes, called IDs, for the network devices. For the transmission of data over the bus 1, the network may provide a broadcast mode for transferring data simultaneously to all connected network devices 4, 5, 6 and a directed communication mode for transferring data only to selected ones of the plurality of network devices 4, 5, 6. In order to transmit a data packet in the broadcast mode, the identification code may be omitted from the data packet, and an invalid identification code or a special reserved identification code may be used. In order to transmit in the directed communication mode, the data packet may comprise a valid identification code.

The network devices 4, 5, 6 are arranged in the target environment without being fully set up, meaning that not all necessary program modules are loaded into the network devices. The loading of further required program modules into the network devices 4, 5, 6 after mounting them in their target environment is called in-system programming. The network may of course also comprise network devices that are fully programmed or set up and need no further program module or data for their operation.

In order to load a program module into one of the plurality of network devices 4, 5, 6 first the host 2 sends via the interface 3 and the bus 1 an ID-generator to the network devices 4, 5, 6 which then receive the ID-generator and store it in their respective memory. The ID-generator is a program module or, generally speaking, control data that controls the generation of an identification code by the network device 4, 5, 6.

In one embodiment individual ones of the network devices 4, 5, 6 or other devices connected to the bus 1 do not receive the ID-generator or do not store it in memory. This can be useful if a device connected to the network does not need an identification code.

The ID-generator is then executed in the network devices 4, 5, 6 and an identification code is generated in each of the network devices 4, 5, 6. If two of the plurality of network devices 4, 5, 6 generate the same identification code, a conflict routine is executed in order to resolve the conflict and to generate for at least one a new identification code. In order to generate the identification code, the timer in each one of the network devices 4, 5, 6 is fed by a clock generated by the clock generator. After a certain time period a number created by the timers is read. This number may be the number of cycles of the clock during that time period. In order to generate different identification codes, the generation of this number in the different network devices must be independent in each device and allow for variations. One possibility is that the clock generators in the different network devices work independently from each other and frequency differences occur, or that the network devices do not use exactly the same time period. In another embodiment, the content of a volatile memory after power-up can be used for generating a random number.

After a unique identification code is generated for each network device 4, 5, 6 that requires it, the host 2 assigns a program module to one or more identification codes depending upon how many of the network devices 4, 5, 6 need this program module. Then the program module is loaded into the network device 4, 5, 6 with the identification code assigned to this program module. If the program module is to be loaded in more than one network device 4, 5, 6 it can be loaded in parallel or sequentially in the network devices 4, 5, 6. The identification code is loaded according to the data transfer mechanism used within the network.

For the loading of the ID-generator, a bootstrap loader is used that is activated after start or reset of the network devices 4, 5, 6 and loads over the bus 1 a certain number of commands or data into the memory and executes them. This initial set of commands may be the ID-generator or may be a routine to load further commands, for example the ID-generator, into the memory. The memory may comprise random-access-memory for the program modules and further commands or data to be loaded into the network device 4, 5, 6 and also read-only-memory for permanent commands or data such as, for example, the bootstrap loader.

The activation of the bootstrap loader is optional and dependent on settings which can be internal settings in a non-volatile memory of the network devices 4, 5, 6 or external settings such as a specific voltage or circuit connected to a connector of the network device 4, 5, 6. This setting may be modified so that the bootstrap loader is not executed every time. Once a network device 4, 5, 6 is fully setup and provided with all program modules necessary for its operation, the start of the bootstrap loader may be deactivated.

In the following an embodiment of the generation of the identification code is described. The ID-generator comprising the corresponding program code is stored in a memory called XRAM. At the program start, an XRAM pointer VAR1 is defined to point at the topmost address of the defined XRAM region.

For this purpose the XRAM pointer is decremented. Next the content of this XRAM pointer is read and stored in the variable VAR1. The timer is set up to run for VAR1 counts. Once this operation is completed the 16 bit counter result is stored in the two registers timer_low (TL0) and timer_high (TH0). The values timer_low and timer_high are added together and only the resultant 8 bit value is retained to form the random identification code or ID respectively.

Then in the following phase the host 2 sends out requests using different identification codes and waits for responses in order to determine whether a network device 4, 5, 6 with a specific identification code is present or, in other words, if that specific identification code has been generated by a network device 4, 5, 6 of the network. The host 2 polls every identification code that according to the arithmetic method used by the ID-generator can be generated. If for example the ID-generator generates only identification codes with eight bits and omits certain reserved codes, then the host 2 polls the code from 0x00 to 0xFF omitting the reserved codes. In one embodiment using a LIN bus the code 0x7F is reserved for broadcast transmissions and is therefore omitted. Here and in the following a hexadecimal number is represented by 0x followed by the hexadecimal number.

For this purpose the host 2 sends out the sequence 0x80, NAD, 0xA0, wherein NAD is the respective identification code also as 8-bit number. The host 2 can detect which identification codes are used by network devices 4, 5, 6 and whether there is a conflict between two network devices 4, 5, 6 having the same identification code. For this purpose it may be provided that the host 2, after polling a certain identification code, receives different responses depending on whether a code is not used, is used by only one network device 4, 5, 6, or is used by more than one network device 4, 5, 6. If there is a conflict and for at least one network device 4, 5, 6 a new identification code is required, the host 2 can start the ID-generator again only for this network device or also for all network devices until no identification code is assigned to more than one network device. After unique identification codes within the network are achieved, the identification codes can be stored in the respective network device, for example in a non-volatile memory.

Figure 5:
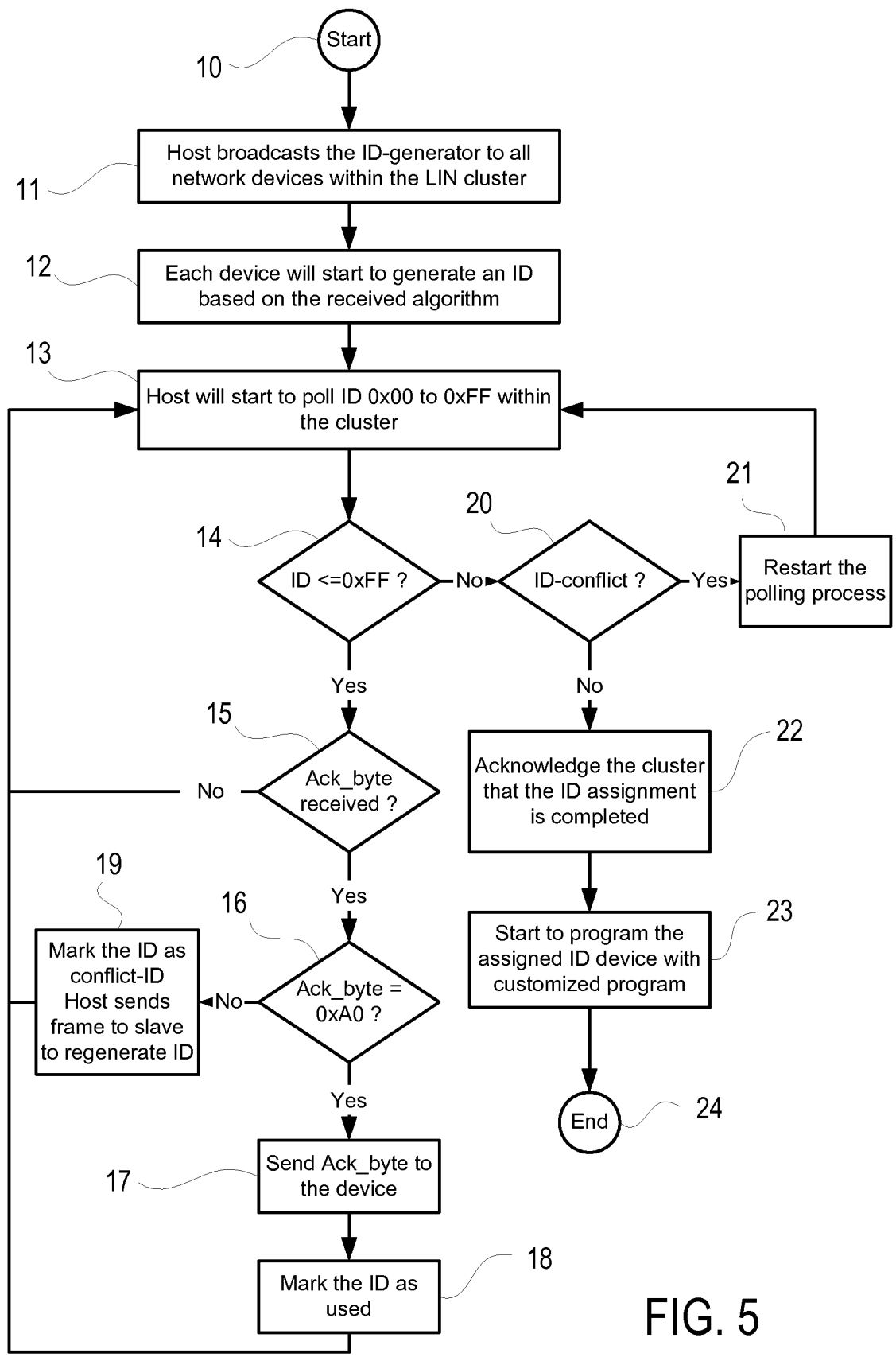
FIG. 5 shows a flow chart of a method of generating identification codes according to an embodiment of the invention.

FIG. 5 is a flow chart of the generation of unique identification codes for the network devices 4, 5, 6 in detail. In the following method, steps involving a decision are depicted as diamonds and method steps without a decision as rectangles. After the start in step 10, in step 11 the host 2 broadcasts the ID-generator to all network devices 4, 5, 6 within the LIN cluster connected to bus 1. Next in step 12 each network device 4, 5, 6 executes the ID-generator and generates an identification code. After that in step 13 the host 2 starts to poll the identification codes from 0x00 to 0xFF omitting 0x7F. For this purpose each identification code is sent out separately on the bus 1 to all network devices 4, 5, 6 and the subsequent response for the ID on the bus 1 is analyzed. Step 13 begins a certain time period after step 12 that is long enough to allow the network devices 4, 5, 6 to complete the generation of the identification code.

In step 14 it is determined whether all different identification codes have been polled thus forming a loop performed 255 times from 0x00 to 0xFF comprising the steps 13-19. As soon as the identification code 0xFF has been processed and the code is no longer less than or equal to 0xFF, the loop is exited towards step 20.

Within the loop for the identification codes, in step 15 it is determined whether an acknowledge byte is received as a response. If not then no network device 4, 5, 6 has this ID and the loop returns to step 13, sending out the next ID on the bus 1. If an acknowledge byte is received, it is determined in step 16 whether the acknowledge byte is 0xA0, meaning that there is no conflict and only one network device 4, 5, 6 has this ID. If the acknowledge byte is not 0xA0, in step 19 this ID is marked in the host 2 as a conflict-ID and the host sends a frame to the slave to regenerate the identification code. Step 19 is followed by step 13 sending out the next ID. If in step 16 the acknowledge byte is 0xA0, step 17 is performed, sending an acknowledge byte from the host 2 to the network device 4, 5, 6 having this ID. Next, in step 18, this ID is marked in the host 2 as used ID. After step 18 the loop returns to step 13 and continues with the next ID.

After all identification codes from 0x00 to 0xFF have been processed, the loop is exited from step 14. Next, in step 20, it is determined whether there was an ID-conflict or an ID was marked as a conflict-ID. If there was a conflict, in step 21 the ID generating process is started again in a modified manner so that the network devices 4, 5, 6 generate different identification codes. If the process of generating the IDs is subject to random deviations, the ID generating process simply may be started again since in such a case each time the process is carried out different IDs may be generated. Furthermore, it is possible to modify settings influencing the generation of the IDs. Step 21 is followed by step 13 and the loop through all IDs is repeated. If no ID was marked as a conflict-ID, every network device 4, 5, 6 has a unique identification code and step 20 is followed by step 22. In step 22, an acknowledgment is sent to all devices in the network or other devices for which it may be relevant that the assignment of IDs is completed.

Next, in step 23, the IDs are used to load program modules into the respective network devices 4, 5, 6 by means of the assigned identification codes. Before step 23, the position of the network device 4, 5, 6 assigned to each used ID may be determined. For this purpose the network device 4, 5, 6 assigned to a specific ID may be addressed and a certain interaction of that network device 4, 5, 6 with its environment triggered. The result of that interaction is analyzed in order to determine the position of this network device 4, 5, 6. The interaction may comprise applying electrical signals to further components connected to the network device 4, 5, 6 and then detecting a reaction to those signals.

Figure 2:
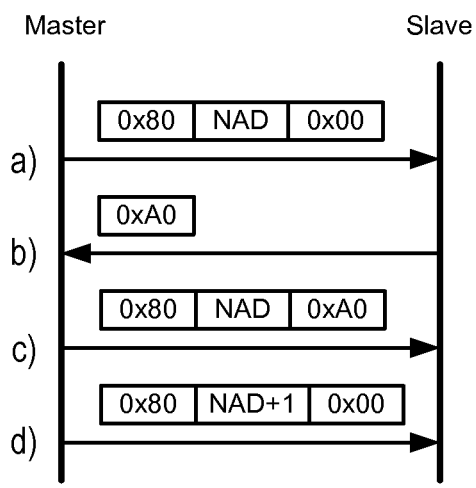
FIG. 2 shows a sequence of data transmissions within the network when a unique identification code is generated for a network device.
Figure 3:
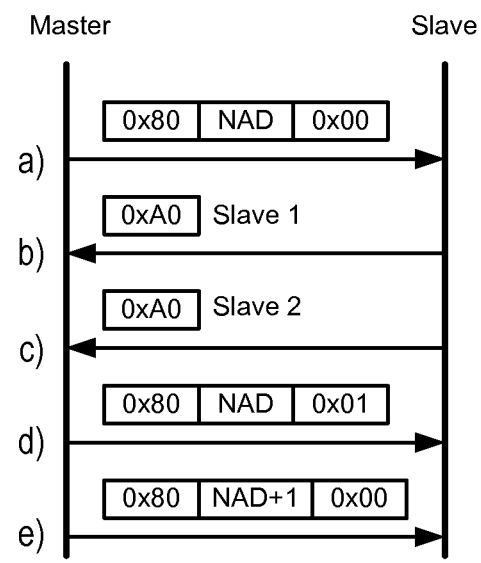
FIG. 3 shows a sequence of data transmissions within the network when a conflict between two identical identification codes occurs.
Figure 4:
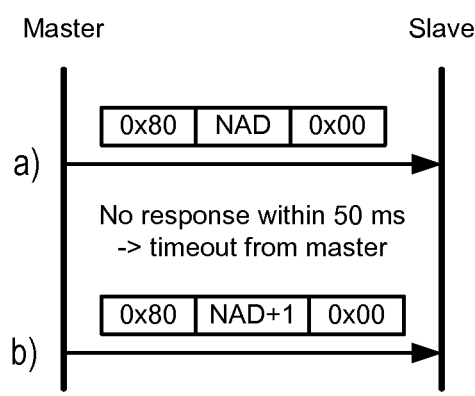
FIG. 4 shows a sequence of data transmissions within the network when an identification code is not used within the network.

In FIG. 2, FIG. 3 and FIG. 4 the data transfer over the bus 1 is shown for different situations according to a further embodiment. Master refers to the host 2 and slave to the plurality of network devices 4, 5, 6. NAD is the actual ID. The data traffic sequence is shown top down and designated with small letters a) to e). FIG. 2 depicts a case in which an ID is used by only one network device 4, 5, 6. In this case, in step a) the host 2 sends out the bytes 0x80, NAD and 0x00. In step b), the slave sends back an acknowledge byte 0xA0. This is acknowledged in return by the master in step c) by again sending 0x80 and NAD followed this time by the acknowledge byte 0xA0 instead of 0x00 as in step a). In step d), the master continues this process with the next ID or NAD+1, by sending out the bytes 0x80, NAD+1 and 0x00.

FIG. 3 depicts a conflict situation in which two slaves have the same ID. Again, in step a) the master sends out the bytes 0x80, NAD and 0x00. This time two slaves, slave 1 and slave 2, each send back the acknowledge byte 0xA0. The master consequently sees a byte that is different from 0xA0 and thus can detect the ID conflict. As a consequence the master may transmit the byte 0x01 to both slaves by sending the bytes 0x80, NAD and 0x01, thus triggering a change of the NAD within each slave in order to resolve the conflict. Afterwards, in step e), the master continues with the next ID NAD+1.

FIG. 4 depicts a case in which an ID is not used. After sending out the bytes 0x80, NAD and 0x00 in step a), the master will receive no response since there is no slave with that ID. The master waits for a certain time period, such as 50 milliseconds in one embodiment, and then generates a timeout and continues in step b) with the next ID NAD+1.

The invention claimed is:

1. A method for loading a program module into one of a plurality of programmable network devices connected to a network comprising:
  loading, by a host connected to the network, an ID-generator into at least one of the plurality of network devices, the ID-generator comprising an ID-generator program module for generating a unique identification code for each of the plurality of network devices;
  generating a unique identification code for the at least one of the plurality of network devices by executing the ID-generator program module in the at least one of the plurality of network devices, and by counting clock cycles of a clock signal for a predetermined time period;
  assigning a second program module to at least one unique identification code; and
  loading the second program module into the at least one of the plurality of network devices having the unique identification code assigned to the second program module.

2. The method of claim 1, wherein assigning a second program module to at least one unique identification code further comprises determining the position of one of the plurality of network devices before assigning the second program module to at least one unique identification code.

3. The method of claim 2, wherein determining the position of one of the plurality of network devices further comprises determining an environment of the network device.

4. The method of claim 1, wherein generating a unique identification code further comprises generating a random number.

5. The method of claim 1, wherein generating a unique identification code further comprises determining whether the same identification code has been generated for two of the plurality of network devices, and executing in such case a conflict resolving routine.

6. The method of claim 5, wherein executing a conflict resolving routine further comprises re-executing the ID-generator.

7. The method of claim 1, wherein generating a unique identification code further comprises storing a unique identification code in a non-volatile memory of a network device.

8. A method for loading a program module into one of a plurality of programmable network devices connected to a network comprising:
  loading, by a host connected to the network, an ID-generator into at least one of the plurality of network devices, the ID-generator comprising an ID-generator program module for generating a unique identification code for each of the plurality of network devices;
  generating a unique identification code for the at least one of the plurality of network devices by executing the ID-generator program module in the at least one of the plurality of network devices;
  assigning a second program module to at least one unique identification code; and
  loading the second program module into the at least one of the plurality of network devices having the unique identification code assigned to the second program module by determining the position of one of the plurality of network devices before assigning the second program module to at least one unique indentification code,
  wherein determining the position of one of the plurality of network devices further comprises generating an electrical signal at a connector of the network device and detecting a reaction to the electrical signal at a connector of the network device.

* * * * *